United States Patent [19]

Saegusa et al.

[11] Patent Number: 5,220,437
[45] Date of Patent: Jun. 15, 1993

[54] SECONDARY SCANNING CONTROL FOR USE IN FACSIMILE EQUIPMENT HAVING REDUNDANCY SUPPRESSING CODING SYSTEM

[75] Inventors: Hiroshi Saegusa, Kashiwa; Masanori Kamata, Chiba; Yasushi Nakajima, Tokyo; Akihito Mochizuki, Narashino; Akihiro Nagai, Tokyo, all of Japan

[73] Assignee: Matsushita Graphic Communication Systems, Inc., Japan

[21] Appl. No.: 618,558

[22] Filed: Nov. 27, 1990

[30] Foreign Application Priority Data

Nov. 30, 1989 [JP] Japan .................................. 1-311189
Apr. 25, 1990 [JP] Japan .................................. 2-109065

[51] Int. Cl.$^5$ .............................................. H04N 1/17
[52] U.S. Cl. .................................... 358/404; 358/426; 358/474
[58] Field of Search ................ 358/404, 426, 442, 444, 358/474, 486

[56] References Cited

U.S. PATENT DOCUMENTS 3,919,464 11/1975 Kondoh .............................. 358/486
4,521,813 6/1985 Yoshida et al. ...................... 358/404

FOREIGN PATENT DOCUMENTS

58-205372 11/1983 Japan .
60-20950 5/1985 Japan .
60-93877 5/1985 Japan .
60-112370 6/1985 Japan .
60-183874 9/1985 Japan .

Primary Examiner—Edward L. Coles, Sr.
Assistant Examiner—Kim Yen Vu
Attorney, Agent, or Firm—Lowe, Price, LeBlanc & Becker

[57] ABSTRACT

A scanning control system for use in a transmission or reception system of a facsimile equipment for controlling the secondary scanning speed of an image reader or recorder provided therein. In the transmission system, the scanning control system is coupled to an image memory for storing image information inputted from the image reader and supplying the image information to a coder, and responsive to the input signal and output signal of the image memory so as to detect the remaining capacity of the image memory. The scanning control system controls the secondary scanning speed in accordance with the detection results of the remaining capacity of the image memory. The secondary scanning speed is continuously increased under a condition of limiting it to a predetermined maximum speed when the remaining capacity is in a first range, maintained as it is when being in a second range, continuously decreased under a condition of limiting it to a predetermined intermediate speed when being in a third range, and the secondary scanning is stopped when being in a fourth range. In re-start after the stopping, the secondary scanning speed is set to a predetermined minimum speed.

8 Claims, 8 Drawing Sheets

SECONDARY SCANNING CONTROL FOR USE IN FACSIMILE EQUIPMENT HAVING REDUNDANCY SUPPRESSING CODING SYSTEM

BACKGROUND OF THE INVENTION

The present invention relates to a secondary scanning control system for use in a facsmile equipment having a redundancy suppressing coding function.

Generally, facsmile equipment having a redundancy suppressing coding function are arranged so as to intermittently perform the secondary scanning (scanning in a direction relative to a recording or recorded paper sheet for recording or reading of image information) of the image reading or recording section so that the facsmile operation is matchable with the image information transmission, because the image information amount greatly varies in accordance with the contents of the original, to be transmitted, under the condition of a constant transmission speed. However, such an intermittent secondary scanning operation causes limitation to be imposed upon high-speed scanning and difficulty to be encountered to satisfy the follow-up of the mechanism such as a motor in the secondary scanning system, thereby resulting in deterioration of the image quality. One possible solution is to control the secondary scanning speed as exemplified by the Japanese Patent Publication No. 60-20950. That is, according to the prior art secondary scanning control system for facsimile equipment having a redundancy suppressing coding function, the image information amount stored in a line memory is periodically checked at every predetermined interval with respect to the secondary scanning speed so as to stepwise change, in accordance with the result, the secondary scanning speed for the next predetermined interval. There is a problem, however, in that it is required to increase the number of the steps of the secondary scanning speeds because the great speed variation easily affects the image particularly at the transition from the present interval to the next interval, while increasing the number of the steps of the secondary scanning speeds takes a long time in changing to a desirable scanning speed and the disturbance of the image tends to occur due to the frequent stepwise speed changing operation so that limitation is imposed upon the increase in the number of the steps of the scanning speeds. In addition, because the determination of the secondary scanning speed with respect to the image information amount is effected in units of line, the processing amount increases in response to the increase in the secondary scanning speed so as to impose a heavy burden upon the image information detecting section and the secondary scanning speed control section.

SUMMARY OF THE INVENTION

It is therefore an object of the present invention to provide a secondary scanning control system for use in a facsimile equipment which is capable of smoothly controlling the secondary scanning speed in accordance with the image information amount in an image memory without increasing the processing amount.

With this and other features which will become apparent as the description proceeds, according to the present invention applied into an image information transmission system equipped with image reading means for scanning an information-recorded member having thereon image information so as to read the image information, image memory means coupled to the image reading means for inputting the image information read by the image reading means and storing the read image information, and coding means coupled to the image memory means for coding the image information outputted from the image memory means and outputting coded image information to an external circuit, a scanning control system comprises remaining capacity detecting means coupled to the image memory means for detecting a remaining capacity in the image memory means in connection with the input of the image memory means from the image reading means and the output of the image memory means to the coding means; and scanning speed control means for controlling a scanning speed of the image reading means in accordance with the remaining capacity A of the image memory means detected by the remaining capacity detecting means. The scanning speed control means performs the control so that 1) when the remaining capacity A is equal to or greater than a predetermined value A3, continuously increase the scanning speed of the image reading means under a condition of limiting it to a predetermined speed Vmax; 2) when the remaining capacity A is equal to a predetermined value A2 or is in a range between the predetermined value A3 and the predetermined value A2 where $A2 < A3$, maintain the scanning speed of the image reading means as it is; 3) when the remaining capacity A is equal to a predetermined value A1 or is in a range between the predetermined value A2 and the predetermined value A1 where $A2 > A1$, continuously decrease the scanning speed under a condition of limiting it to a predetermined speed Vmid where $Vmid < Vmax$; and 4) when the remaining capacity A is smaller than the predetermined value A1, stop the scanning of the image reading means.

Preferably, the scanning speed control means causes the scanning of the image reading means to change from a speed-maintaining state to a speed-increasing state at the time that the remaining capacity A becomes equal to or greater than a predetermined value A31, where $A31 > A3$, when the remaining capacity A is changed from the state of $A3 > A \geq A2$ to the state of $A \geq A3$. Furthermore, the scanning speed control means causes the scanning of the image reading means to change from a speed-decreasing state to a speed-maintaining state at the time that the remaining capacity A becomes equal to or greater than a predetermined value A21, where $A2 < A21 < A3$, when the remaining capacity A is changed from the state of $A2 > A \geq A1$ to the state of $A3 > A \geq A2$. Still further, the scanning speed control means re-starts the scanning at a predetermined speed Vmin where $0 < Vmin \leq Vmid$ when the remaining capacity A becomes equal to or greater than the predetermined value A1 after the stopping of the scanning.

In accordance with the present invention, there is further provided a scanning control system for use in an image information reception system provided with decoding means for decoding image information inputted from an external circuit, image memory means coupled to the decoding means for storing the image information inputted from the decoding means, and image recording means coupled to the image memory means for scanning an information-recording member so as to record the image information inputted from the image memory means. The scanning control system comprises used capacity detecting means coupled to the image memory means for detecting a currently used capacity in the image memory means in connection with the input of said image memory means from the decoding means and the output of the image memory means to the image recording means; and scanning speed control means for controlling a scanning speed of said image recording means in accordance with the used capacity B of said image memory means detected by the used capacity detecting means. The scanning speed control means performs the control so that 1) when the used capacity is equal to or smaller than a predetermined value B1, stop the scanning; 2) when the used capacity B is equal to a predetermined value B2 or is in a range between the predetermined value B1 and the predetermined value B2 where B1<B2, continuously decrease the scanning speed under a condition of limiting it to a predetermined speed Vmid; 3) when the used capacity B is equal to a predetermined value B3 or is in a range between the predetermined value B2 and the predetermined value B3 where B2<B3, maintain the scanning speed as it is; and 4) when the used capacity B is greater than the predetermined value B3, continuously increase the scanning speed under a condition of limiting it to a predetermined speed Vmax where Vmax>Vmid.

Preferably, the scanning speed control means causes the scanning of the image recording means to change from a speed-maintaining state to a speed-increasing state at the time that the used capacity B becomes equal to or greater than a predetermined value B31, where B31>B3, when the used capacity B is changed from the state of B2<B≦B3 to the state of B3<B. Further, the scanning speed control means causes the scanning of the image recording means to change from a speed-decreasing state to a speed-maintaining state at the time that the used capacity B becomes equal to or greater than a predetermined value B21, where B2<B21<B3, when the used capacity B is changed from the state of B1<B≦B2 to the state of B2<B≦B3. Still further, the scanning speed control means re-starts the scanning at a predetermined speed Vmin where 0<Vmin<Vmid when the used capacity B becomes in the range between the predetermined values B2 and B3 after the stopping of the scanning.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
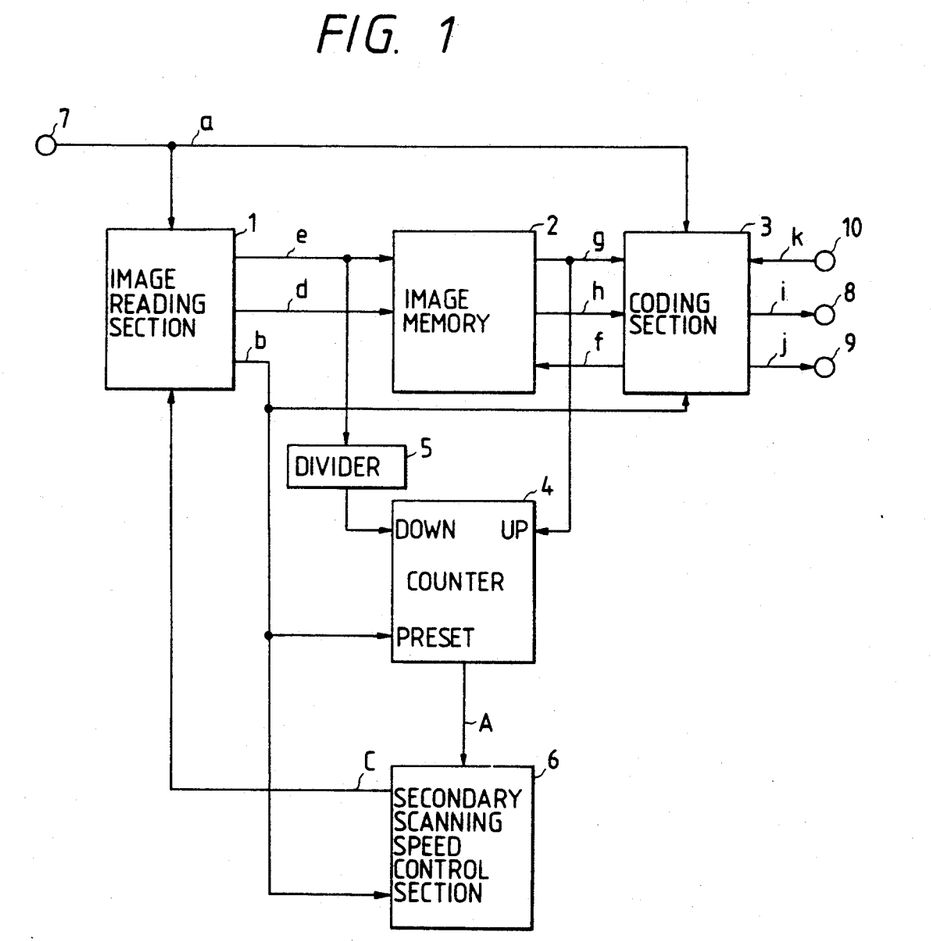
FIG. 1 is a block diagram showing a secondary scanning control system according to an embodiment of the present invention which is incorporated into a transmission system of a facsimile equipment.

Referring now to FIG. 1, there is illustrated a secondary scanning control system according to an embodiment of the present invention which is incorporated into a transmission system of a facsmile equipment equipped with a redundancy suppressing coding system. In FIG. 1, illustrated at numeral 1 is an image reading section of the facsimile equipment which scans an original to read image information indicated in the original, the read image information being supplied to an image memory 2 for temporarily stores it. The image memory 2 is coupled to a coding section 3 for performing the redundancy-suppressing coding process. Also provided is an up-and-down counter 4 coupled to the output side of the image memory 2 and further coupled through a divider 5 to the output side of the image reading section 1 so as to detect a degree of the blank (remaining capacity) in the image memory 2. Illustrated at numeral 6 is a secondary scanning speed control section coupled to the up-and-down counter 4 for detecting the count value of the up-and-down counter 4, i.e., the remaining capacity of the image memory 2, at a predetermined time interval so as to control the secondary scanning speed of the image reading section 1 in accordance with the detection results.

An input terminal illustrated at numeral 7 in FIG. 1 is responsive to an operation-start signal a supplied from an external circuit, not shown, and the operation-start signal a is led to the image reading section 1 and further to the coding section 3. An output terminal 8, coupled to the coding section 3, is for supplying a coded image information signal i to an external circuit such as a buffer memory (not shown) adapted to achieve the speed matching with a transmission path and an output terminal 9, similarly coupled to the coding section 3, is for supplying a sampling clock signal (clocks) j to the same external circuit. An input terminal illustrated at numeral 10 is responsive to a ready signal k from another external circuit or the same external circuit, not shown, which ready signal k is inputted therefrom in order to indicate that the coded image information signal i from the coding section 3 is acceptable to the same external circuit.

The image reading section 1 generates a bit-serial image information signal d and a sampling clock signal (clocks) e which are in turn inputted to the image memory 2. The sampling clock signal e from the image reading section 1 is also supplied to the divider 5 so as to be divided to form a clock signal in units of byte because of being the clock signal for the bit-serial image information signal d, the output of the divider 5 being applied to a count-down pulse input terminal of the up-and-down counter 4. In addition, the image reading section 1 generates a page signal b indicating the interval corresponding to one page of the original, the page signal b being supplied to the coding section 3, secondary scanning speed control section 6 and a preset input terminal of the up-and-down counter 4.

The image memory 2 generates an image information signal h in units of byte and further generates a sampling clock signal g for the image information signal h, the image information signal h and the sampling clock signal g being respectively supplied to the coding section 3. The sampling clock signal g is also applied to a count-up pulse input terminal of the up-and-down counter 4. On the other hand, the coding section 3 supplies the image memory 2 with an image information demand signal f. The up-and-down counter 4 supplies the secondary scanning speed control section 6 with a signal corresponding to a count value A, and the secondary scanning speed control section 6 outputs to the image reading section 1 a speed-instructing signal c indicative of the increasing (acceleration), decreasing (deceleration) or maintaining of the secondary scanning speed or the stopping of the secondary scanning.

Operation of this transmission system will be described hereinbelow. In response to the operation-start signal a supplied through the input terminal 7 from the external circuit, the image reading section 1 starts the generation (ON state) of the page signal b to the up-and-down counter 5, and further to the secondary scanning speed control section 6 whereby the speed-instructing signal c to be outputted from the secondary scanning speed control section 6 is indicative of the secondary scanning acceleration. That is, in response to the speed-instructing signal c therefrom, the image reading section 1 scans the original with the scanning speed being continuously (not stepwise) increased form the minimum speed Vmin. The image information read is outputted as the image information signal d in bit-serial form to the image memory 2. At this time, the sampling clock signal e, together with the image information signal d, is outputted therefrom to the image memory 2. Further, the sampling clock signal e is supplied through the divider 5 to the up-and-down counter 4 which in turn, counts down the clocks produced due to the division of the sampling clock signal e.

Moreover, with the detection of the operation-start signal a from the external circuit (not shown), the coding section 3 checks the ready signal k from the second external circuit (not shown) and supplies the image information demand signal f to the image memory 2 in response to the detection of the ready signal k. In response to the supply of the image information demand signal f, the image memory 2 outputs, together with the sampling clock signal g, the image information corresponding to one byte as the image information signal h if there is the remaining image information to be outputted. The up-and-down counter 4 counts up the sampling clock signal g from the image memory 2. In this case, the count value A of the up-and-down counter 4 is representative of the remaining capacity of the image memory 2.

In response to the detection of the sampling clock signal g from the image memory 2, the coding section 3 stops the generation of the image information demand signal f and codes the image information inputted. Until the read-scanning operation per one page of the original is completed to cause the generation of the page signal b to be stopped and the entire image information stored in the image memory 2 is completely read out, the coding section 3 repeatedly performs the alternate ON and OFF of the image information demand signal f so as to successively code the image information. Further, when the ready signal k is generated from the external circuit, the coding section 3 outputs, together with the sampling clock signal j, the coded image information signal i to the external circuit. On the other hand, if there is no the ready signal k, the coding section 3 waits for the supply of the ready signal k from the external circuit.

The secondary scanning speed control section 6 controls the secondary scanning speed of the image reading section 1 through the speed-instructing signal c in accordance with the relation between the count value A of the up-and-down counter 4, i.e., the remaining capacity of the image memory 2, and predetermined values A1, A2, A21, A3 and A31. That is, the secondary scanning speed control is performed as follows:

(1) when the count value A of the up-and-down counter 4 is equal to or greater than the predetermined value A3, i.e., exists in a first region ($A \geq A3$), the secondary scanning speed control section 6 outputs a speed-instructing signal c so that the secondary scanning of the image reading section 1 enters into a continuously accelerating state (the secondary scanning speed continuously increases) under the condition of limiting the secondary scanning speed up to a predetermined maximum speed Vmax, and when reaching the maximum speed Vmax, the secondary scanning speed enters into the maintained state (becomes constant);

(2) when the count value A is smaller than A3 and equal to or greater than A2, i.e., when A is in a second region ($A3 > A \geq A2$), the secondary scanning speed enters into the matintained state without changing, i.e., is kept as it is;

(3) when A is in a third region ($A2 > A \geq A1$), the secondary scanning enters into a decelerating state (the secondary scanning speed decreases) under the condition of limiting the secondary scanning speed to a speed Vmid($<$Vmax), and when reaching the speed Vmid, the secondary scanning speed enters into the maintained state; and (4) when A is in a fourth region ($A1 > A$), the secondary scanning enters into the stopped state.

Here, the above-described secondary scanning speed control is effected with the following conditions: that is, (a) in the case of transferring from the second region ($A3 > A \geq A2$) to the first region ($A \geq A3$), the secondary scanning enters into the accelerating state at the time of $A \geq A31$ without immediately entering thereinto;

(b) in the case of transferring from the third region ($A2 > A \geq A1$) to the second region ($A3 > A \geq A2$), the secondary scanning speed enters into the maintained state at the time of $A \geq 21$ without immediately entering thereinto;

(c) when again returning to the first, second or third region after the secondary scanning is stopped due to entering into the fourth region ($A1 > A$), the secondary scanning starts;

(d) the secondary scanning speed at the time of start or re-start of the scanning is set to be a minimum speed Vmin ($0 < $Vmin$ < $Vmid); and (e) the memory capacity necessary for storing the image information corresponding to the number of lines required to effect smooth deceleration from the maximum speed Vmax to the speed Vmid is not greater than a value corresponding to (A2−A1).

As described above, the secondary scanning starts at the speed Vmin at the initial stage and then continuously accelerates under the condition of limiting it up to the maximum speed Vmax. If adequately determining the minimum speed Vmin, it is possible to substantially eliminate the disturbance occurring at the time of the scanning start. Furthermore, after at once reaching the minimum speed Vmax, the maximum speed is maintained so that constant-speed secondary scanning operation is effected at the maximum speed, with the exception of change of the speed-instructing signals.

In the case that the contents of the original are complicated, the coding section 3 takes a longer time for processing and the reading interval of the image memory 2 becomes longer, and hence the count value A of the up-and-down counter 4 decreases. When reaching the second region (A3>A≧A2, the secondary scanning speed control section 6 switches the secondary scanning from the accelerating state to the constant-speed state and generates the speed-instructing signal c so that the image reading section 1 takes the speed-maintaining scanning state. When the count value A further decreases so as to reach the third region (A2->A≧A1), the secondary scanning speed control section 6 switches the speed-instructing signal c from the speed-maintaining state to the speed-decreasing state so as to continuously decrease the secondary scanning speed of the image reading section 1. Thereafter, when the count value A decreases up to the fourth region (A1>A), the secondary scanning speed control section 6 outputs the speed-instructing signal c representative of the scanning-stopping so that the image reading section 1 stops the secondary scanning operation. Since the secondary scanning speed takes the speed Vmid at the time of the switching operation from the speed-decreasing to the scanning-stopping, the disturbance of the secondary scanning due to the stopping scarcely occurs. The speed Vmid is in advance determined to an adequate value whereby the disturbance of the secondary scanning due to the stopping can be disregarded. Thereafter, when entering into A≧A1, the secondary scanning re-starts, while the disturbance of the secondary scanning due to the re-start can similarly be disregarded because the secondary scanning speed takes the minimum speed Vmin at the time of the re-start.

On the other hand, in the case that the contents of the original are simple, the reading of the coding section 3 from the image memory 2 becomes quick so that the count value A takes an increasing tendency. When the count value A shifts from the second region to the first region, the secondary scanning enters into an accelerating state from the time that the count value A exceeds the predetermined value A31 without immediately entering thereinto. Similarly, when the count value A shifts from the third region to the second region, the secondary scanning shifts from the speed-decreasing state to the speed-maintaining state from the time that the count value A exceeds the predetermined value A21 without immediately shifting thereto. In the case of increase in the count value A, these shifting delays allows preventing undersirable fluctuation of the secondary scanning speed with short periods.

When in response to completion of the reading for one page of the original the image reading section 1 stops the generation of the page signal b, irrespective of any secondary scanning speed at that time, the secondary scanning speed control section 6 generates the speed-instructing signal c indicative of the scanning-stopping so as to stop the secondary scanning operation of the image reading section 1. When at this time the secondary scanning speed is the maximum speed Vmax for instance, the disturbance of the secondary scanning occurs due to the stopping, while in practice there is no problem because of no original. Thus, according to this embodiment, by controlling the secondary scanning speed of the image reading section 1 in accordance with the remaining capacity (A) of the image memory 2, it is possible to smoothly perform the speed-variable secondary scanning without deteriorating the quality of the read image.

Figure 2:
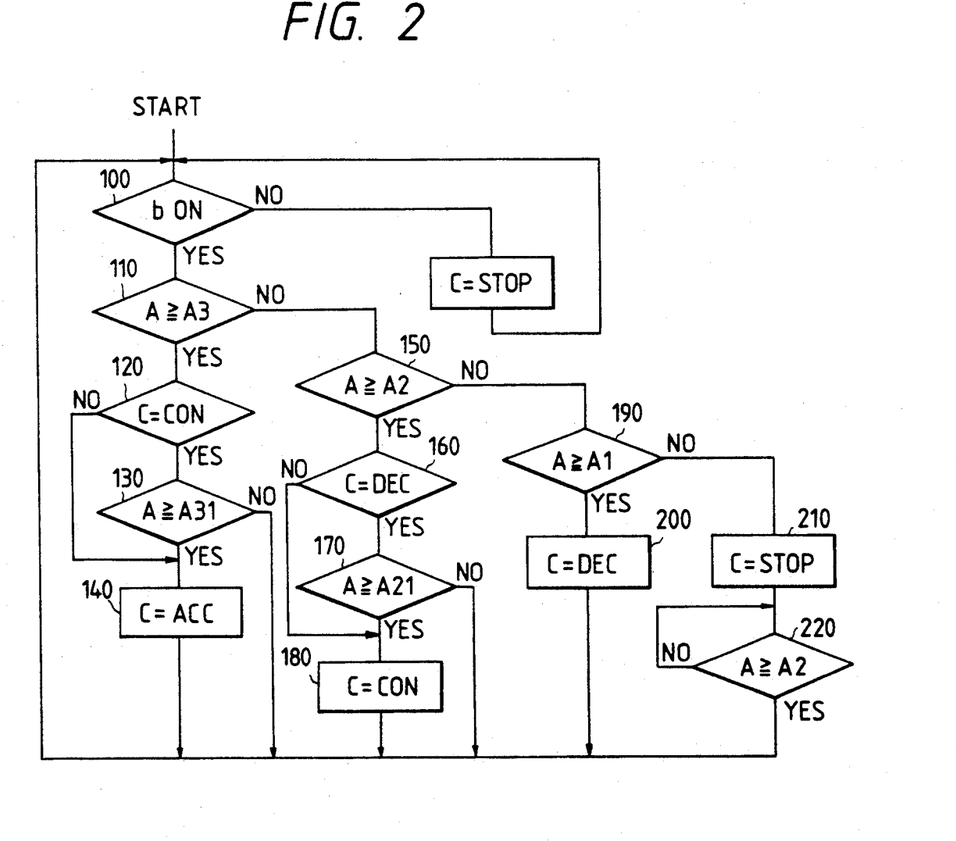
FIG. 2 is a flow chart showing the operation to be executed by the secondary scanning control system illustrated in FIG. 1.

FIG. 2 is a flow chart showing the above-described operation of the secondary scanning speed control section 6. Although being obvious from the above description, the operation will briefly be described hereinbelow. In FIG. 2, the operation starts with a step 100 to check whether the page signal b is in the ON state. If the answer in the step 100 is affirmative, a step 110 follows to check whether the count value A representing the remaining capacity of the image memory 2 is equal to or greater than the predetermined value A3. If so, control advances to a step 120 in order to check whether the speed-instructing signal C is indicative of the speed-maintaining state (CON), that is, whether the count value A is shifted from the second region to the first region. If the answer in the step 120 is negative, control jumps up to a step 140 so as to accelerate (speed-increase) the secondary scanning of the image reading section 1 (ACC) under the condition of limiting it to the maximum value Vmax. If the answer is affirmative, control goes to a step 130 to check whether A≧A31. If affirmative, control proceeds to the above-mentioned accelerating step 140. On the other hand, if the answer in the previous step 110 is negative, the operation flow goes to a step 150 to check whether A≧A2, that is whether A is in the second region. If so, control advances to a step 160 in order to check whether the speed-instructing signal C represents the decelerating state (DEC), that is, whether A is shifted from the third region to the second region. If the answer is negative, control jumps up to a step 180 so as to cause the image reading section 1 to enter into the speed-maintaining state. If affirmative, control advances to a step 170 in order to whether A≧A21. If so, control proceeds to the previously described speed-maintaining step 180. On the other hand, if the answer in the step 150 is negative, the operational flow goes to a step 190 to check whether A≧A1. If so, control advances to a step 200 to cause the secondary scanning of the image reading section 1 to enter into the speed-decreasing state under the condition of limiting it to the value Vmid. If in the step 190 the answer is negative, control goes to a step 210 to stop the secondary scanning operation of the image reading section 1. Theraftar, control advances to a step 220 in order to check whether A≧A2. When A≧A2, the operation re-starts. Here, when shifting from the stopping state to the speed-maintaining state, the secondary scanning speed is set to the minimum speed Vmin.

Figure 3:
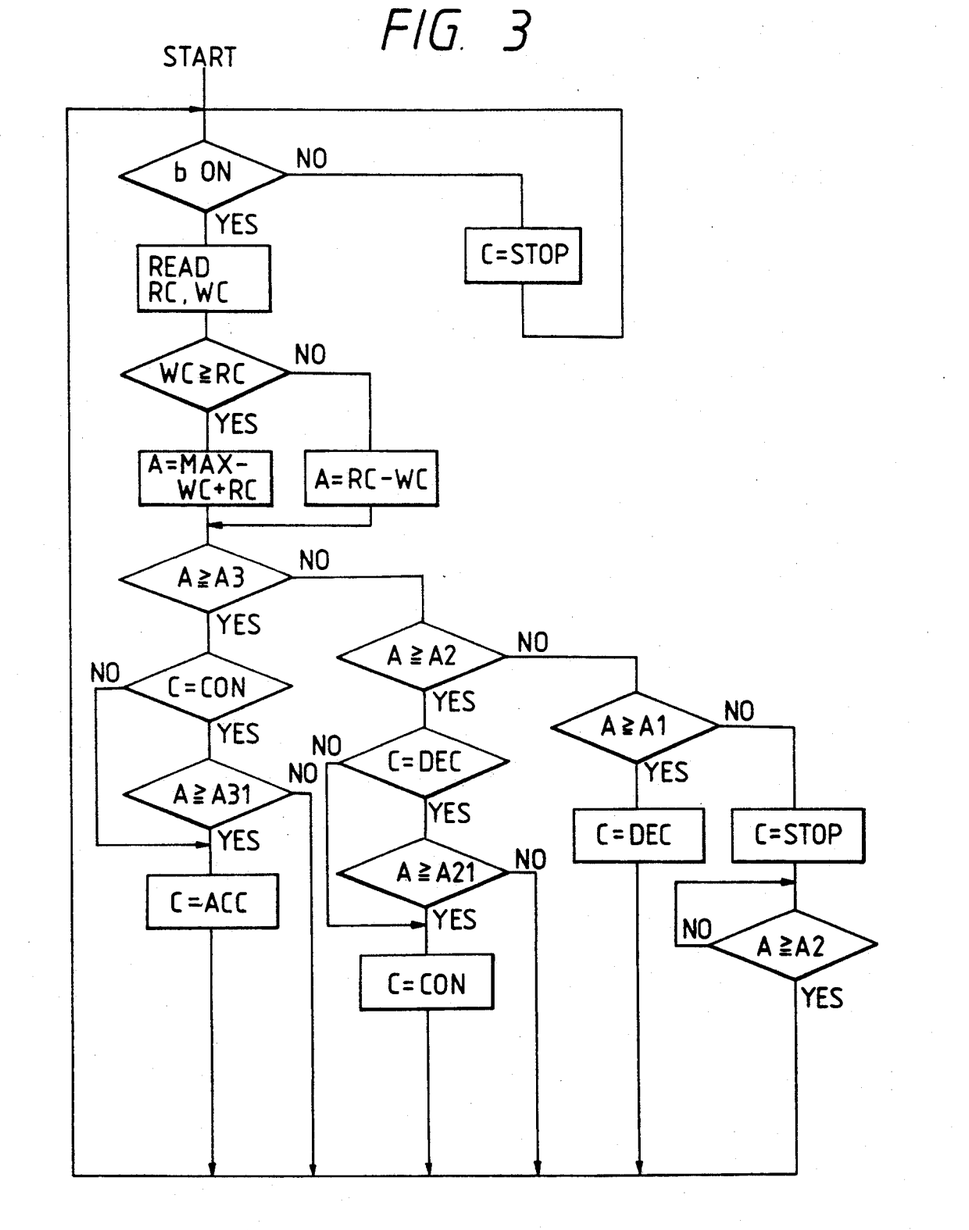
FIG. 3 is a flow chart showing a modification of the operation illustrated in FIG. 2.

Although in the above-described embodiment the remaining capacity of the image memory 2 is counted in the up-and-down counter 4 on the basis of the output signal of the divider 5, it is also appropriate to calculate the remaining capacity A of the image memory 2 by an appropriate device such as a CPU (central processing unit) on the basis of the count value WC of a writing counter of the image memory 2 and the count value RC of a reading count of the image memory 2. That is, the remaining capacity A can be obtained in accordance with A=MAX−WC+RC (in the case of WC≧RC) or A=RC−WC (in the case of WC<RC) where MAX represents the entire capacity of the image memory 2. In this case, the operation of the image reading section 1 becomes as illustrated by a flow chart in FIG. 3. Here, it is also appropriate to obtain the remaining capacity A in accordance with A=RC−WC irrespective of the relation in magnitude between WC and RC. In this case, when A is negative, the complement becomes A.

A description will be made hereinbelow with reference to FIG. 4 in terms of a secondary scanning control system incorporated into a reception system of a facsimile equipment having a redundancy suppressing coding function according to another embodiment of the present invention.

Figure 4:
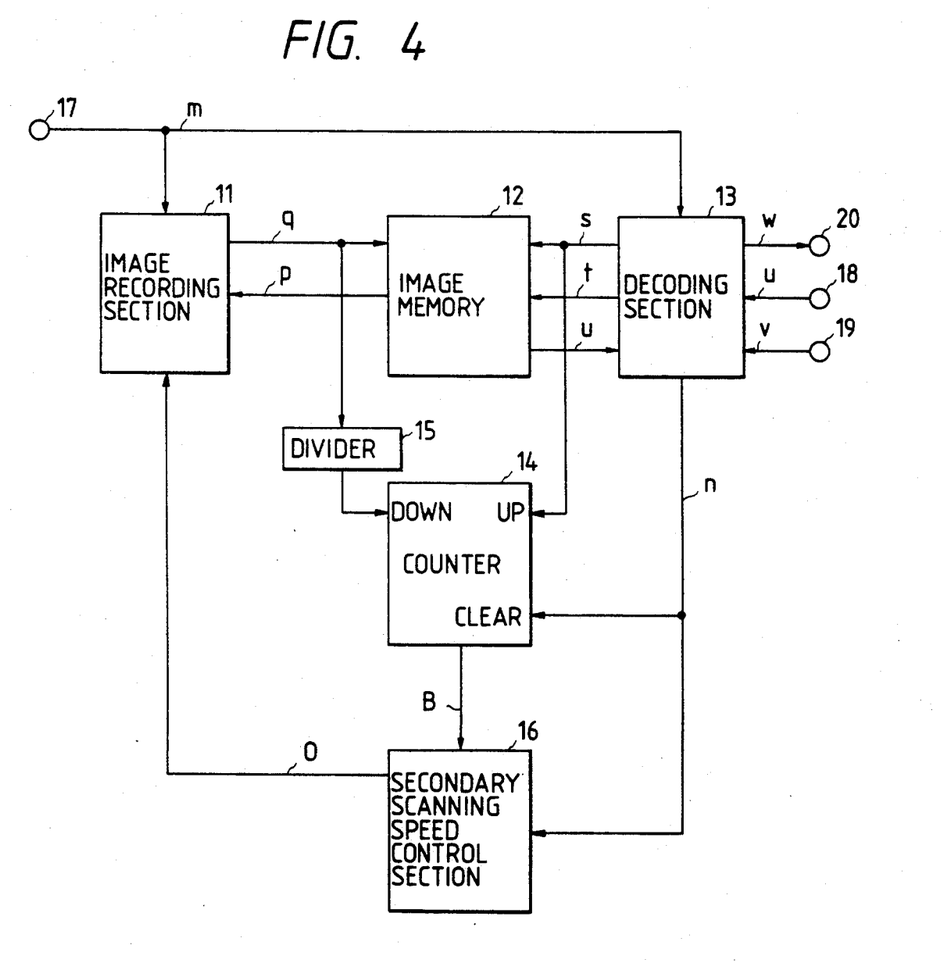
FIG. 4 is a block diagram showing an secondary scanning control system according to another embodiment of this invention which is incorporated into a reception system of a facsmile equipment.

In FIG. 4, illustrated at numeral 11 is an image recording section for recording an image by scanning an recording medium not shown, which si coupled to an image memory 12 for temporarily storing image information to be recorded on the recording medium through the image recording section 11. The image memory 12 is also coupled to a decoding section 13 for decoding decoded image information inputted from an external circuit not shown, and further coupled to an up-and-down counter 14 for detecting the stored or accumulated amount of non-recorded image information in the image memory 12 (the memory capacity of the image memory 12 occupied by the non-recorded image information). The output of the up-and-down counter 14 indicative of its count value B is supplied to a secondary scanning speed control section 16 which in turn, generates to the image recording section 11 a speed-instructing signal in accordance with the count value B of the up-and-down counter 14 so as to control the secondary scanning speed of the image recording section 11.

In addition, provided is an input terminal 17 for receiving an operation-start signal m from an external circuit, not shown, which is supplied to the image recording section 11 and further to the decoding section 13. Also provided are input terminals 18 and 19 for receiving a coded image information signal u from an external circuit (for example, a buffer memory for taking speed-matching with the transmission line) and a sampling clock signal v therefor. The inputted coded image information signal u and the sampling clock signal v are respectively are led to the decoding section 13. Illustrated at numeral 20 is an output terminal of the decoding section 13 for outputting a coded image information demand signal w to an external circuit, not shown, to demand the input of the coded image information to the external circuit.

In response to the input of the operation-start signal m through the input terminal 17 from the external circuit, the decoding section 13 generates a page signal n, indicative of the start and end of the decoding operation for one page interval, which is in turn supplied to a clear input terminal of the up-and-down counter 14 and further to the secondary scanning speed control section 16. The supply of the page signal n causes the up-and-down counter 14 to be cleared. At the same time, the decoding section 13 generates the coded image information demand signal w to the external circuit, not shown, so as to demand coded image information. If there is coded image information to be supplied, the external circuit supplies, together with the sampling clock signal v, the code image information signal u in units of one byte to the decoding section 13. In response to detection of the ON state of the sampling clock signal v, the decoding section 13 stops the generation of the coded image information demand signal w and decodes the inputted coded image information (u) and further outputs, together with a sampling clock signal s, the decoded image information as an image information signal t when a ready signal r, indicative of the fact that the image information is acceptable to the image memory 12, is in the ON state. At this time, if the ready signal r is in the OFF state, the decoding section 13 waits until entering into the ON state. In response to detection of the ON state of the sampling clock signal s, the image memory 12 receives the image information signal t and stores therein and further turns OFF the ready signal r. With repetition of the above-described operations (from the turning-ON of the signal w through the turning-ON of the signal v and the turning-OFF of the signal w to the turning-ON of the signal r), the coded image information is successively inputted in units of byte and decoded and stored in the image memory 12.

The up-and-down counter 14 is responsive through its a count-up input terminal to the sampling clock signal s from the decoding section 13 so as to counts up it. On the other hand, in response to the page signal n from the decoding section 13, the secondary scanning speed control section enters into the actuating state so that, when the count value B of the up-and-down counter 14 exceeds a predetermined value (B2), the image recording section 11 takes the speed-maintaining state and starts the secondary scanning operation. The image recording section 11 generates a sampling clock signal g, synchronious with the recording scanning operation, so as to read an image information signal p bit-serially outputted form the image memory 12 in synchronism with the generation of the sampling clock signal g in order to record the corresponding image information on a recording medium.

The sampling clock signal g from the image recording section 11 is also supplied to a divider 15 so as to produce clocks in units of byte, and then to a count-down input terminal of the up-and-down counter 14, whereby the count value B of the up-and-down counter 14 shows the stored amount of the non-recorded image information in the image memory 12 at the present time.

The secondary scanning speed control section 16 generates a speed-instructing signal c so as to perform the secondary scanning speed control of the image recording section 11 as follows in accordance with the relation or comparison between the count value B of the up-and-down counter 14 and predetermined values B1, B2, B21, B3 and B31 where $0<B1<B2<B21<B3<B31<MAX$ (showing the entire capacity of the image memory 12):

(1) when the count value B is in a first region, that is when $B \leqq B1$, the secondary scanning of the image recording section 11 is stopped;

(1) when the count value B is in a second region, that is, when $B1<B \leqq B2$, the secondary scanning speed is continuously decreased under the condition of limiting it to a predetermined scanning speed Vmid, and when reaching the predetermined value Vmid, the secondary scanning enters into the speed-maintaining state (speed-constant state);

(1) when the count value B is in a third region, that is, when $B2<B \leqq B3$, the secondary scanning enters into the speed-maintaining state as it is; and (1) when the count value B is in a fourth region, that is, when $B3<B$, the secondary scanning speed is continuously increased under the condition of limiting it up to a maximum speed Vmax (Vmid<Vmax), and when reaching the maximum speed Vmax, the secondary scanning enters into the speed-maintaining state.

Here, the above-described operations are effected with the following conditions:

(a) when the count value B shifts from the third region to the fourth region, the secondary scanning canges at the time of B>B31 from the speed-maintaining state to the speed-increasing state;

(b) when the count value B transfers from the second region to the third region, the secondary scanning changes at the time of B>B21 from the speed-decreasing state to the speed-maintaining state;

(c) when the count value B returns into the third region after the secondary scanning is stopped due to entering into the first region, the secondary scanning is re-started;

(d) the secondary scanning speeds at the time of start and re-start of the scanning respectively take a minimum speed Vmin (0<Vmin<Vmid);

(e) after the page signal n turns OFF due to completion of the decoding operation for one page in the decoding section 13, the secondary scanning enters into the speed-increasing state under the condition of limiting the secondary scanning speed up to the maximum speed Vmax, irrespective of the count value B; and (f) the memory capacity necessary for storing the image information corresponding to the lines of the number required in order to smoothly perform the speed-decreasing from the maximum value Vmax to the predetermined value Vmid is not greater than a value (B2−B1).

In response to the turning-OFF of the page signal n due to the completion of the decoding for one page, the secondary scanning speed control section 16 determines that the secondary scanning takes the speed-increasing state so that the image information remaining in the image memory 12 is recorded as fast as possible. When the count value B becomes zero, the secondary scanning speed control section 16 determines that the secondary scanning takes the stopped state, so that the recording scanning is terminated. Even if at this time the secondary scanning speed rapidly varies, in practice there is no problem because of completion of the recording. In this embodiment, the shifting from the speed-decreasing to the speed-maintaining or from the speed-maintaining to the speed-increasing is similarly delayed. This purpose is the same as the above-described first embodiment.

Figure 5:
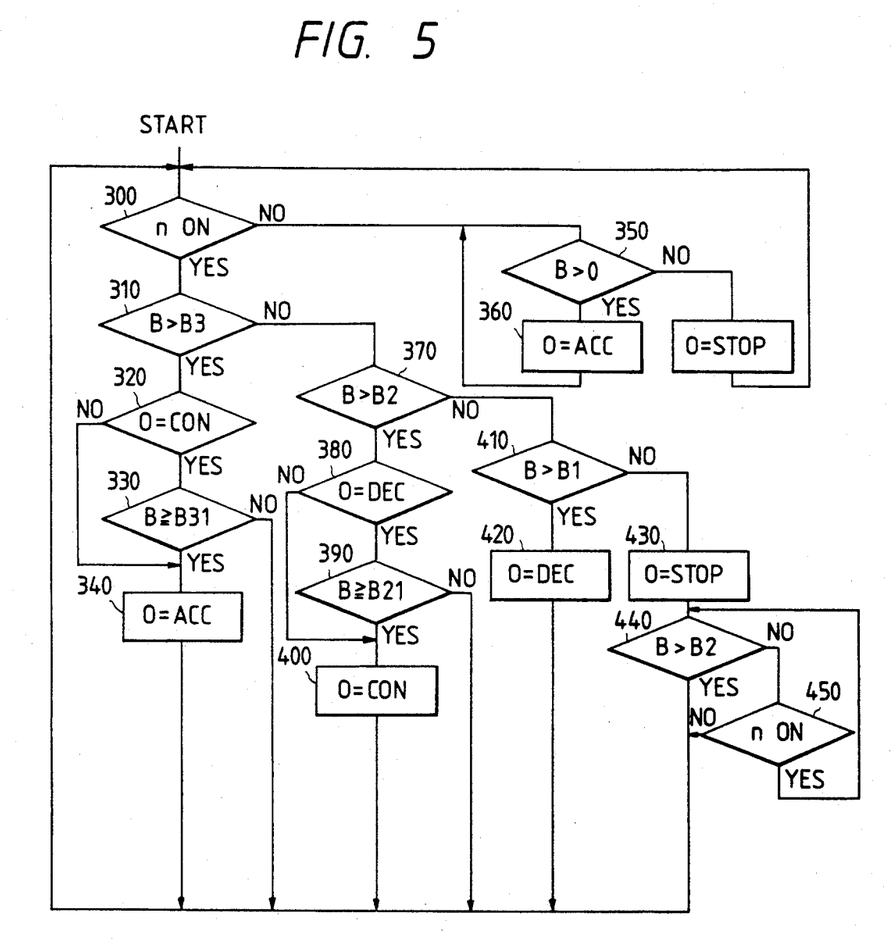
FIG. 5 is a flow chart showing the operation to be executed by the secondary scanning control system illustrated in FIG. 4.

FIG. 5 is a flow chart showing the above-described operation of the secondary scanning speed control section 16 according to this embodiment. Although being obvious from the above description, the operation will briefly be described for a further understanding of this embodiment. In FIG. 5, the operation starts with a step 300 to check whether the page signal n is in the ON state. If the answer is affiramtive, a step 310 follows to check whether the count value b of the image memory 12 (non-recorded image information, i.e., the currently used capacity of the image memory 12) is greater than the predetermined value B3. If so, control goes to a step 320 to check whether the speed-instructing signal o represents the speed-maintaining state of the image recording section 11, that is, whether the count value B is transferred from the third region to the fourth region. If not, control jumps up to a step 340 to accelerate the secondary scanning of the image recording section 1. If so, control advances to a step 330 to check whether B≦B31, and then followed by the step 340. On the other hand, if the answer in the step 300 is negative, the operational flow goes to a step 350 to check whether B>0, and then followed by a step 360 so as to accelerate the secondary scanning under the condition of limiting it up to the maximum value Vmax. If the answer in the step 310 is negative, control goes to a step 370 in order to check whether B>B2. If so, control advances to a step 380 to check whether the secondary scanning is in the accelerating state, that is, whether B is transferred from the second region to the third region. If not, control jumps up to a step 400 to cause the secondary scanning to enter into the speed-maintaining state. If so, control advances to a step 390 to check whether B≦B21, then followed by the above-mentioned step 400. On the other hand, if the answer in the step 370 is negative, the operational flow goes to a step 410 to check whether B>B1. If so control proceds to a step 420 to cause the secondary scanning to enter into the decelerating state. If not, control goes to a step 430 to stop the secondary scanning. After the step 430, a step 440 follows to check whether B>B2. If the answer is negative, control goes to a step 450 to check whether the page signal n is in the ON state. If so, the operational flow returns to the previous step 440.

Figure 6:
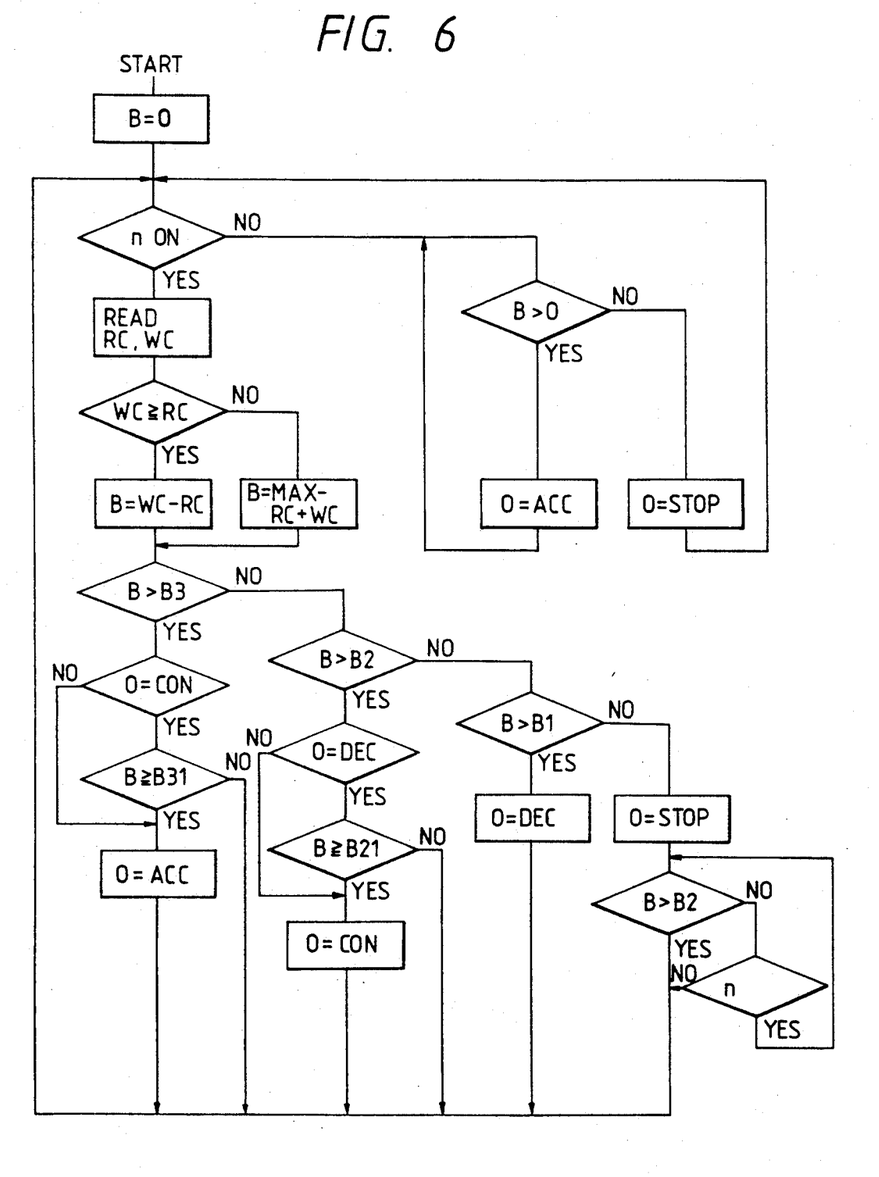
FIG. 6 is a flow chart showing a modification of the operation illustrated in FIG. 5.

As well as in the first embodiment, it is appropriate to calculate the non-recorded image information B by the writing count (value WC) and reading count (value RC) of the image memory 12 without using the up-and-down counter 14 and the divider 15, that is, B=WC−RC (in the case of WC≧RC) or B=MAX−RC+WC (in the case of WC<RC). In this case, the operation will be executed as illustrated by a flow chart in FIG. 6. Further, similarly, it is possible to obtain the value B as B=WC−RC irrespective of the relation in magnitude between WC and RC. When B is negative, the complement becomes B.

Figure 7:
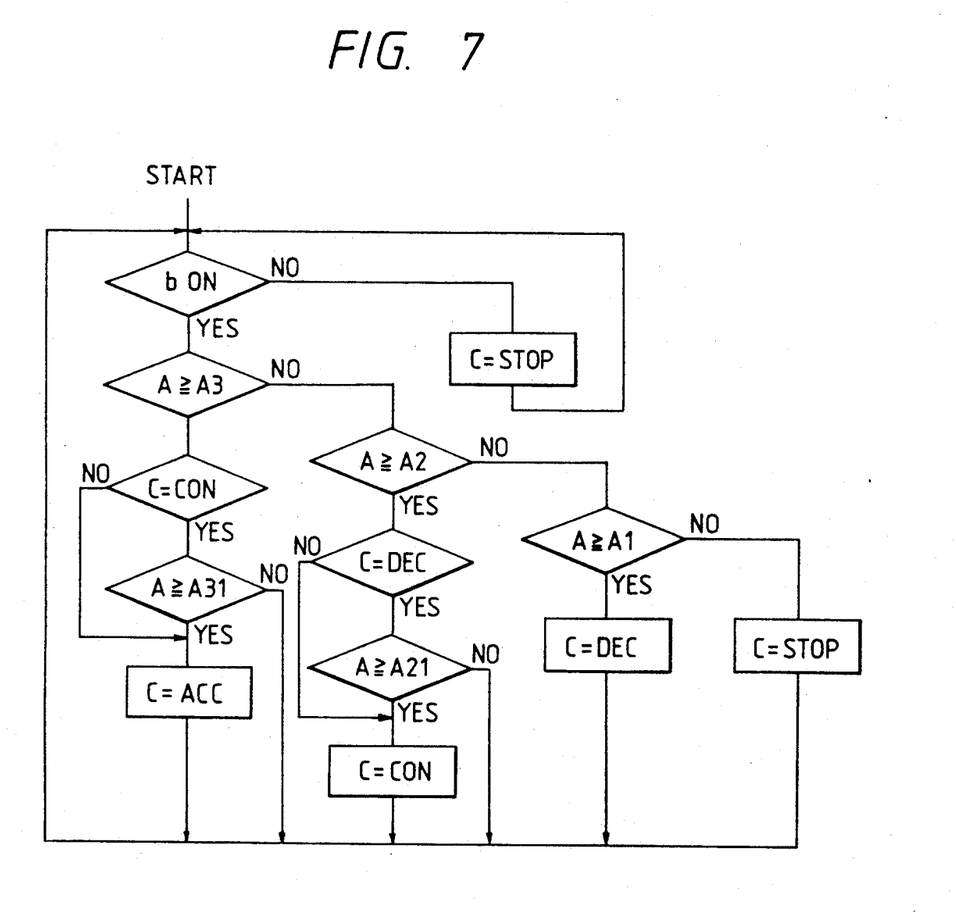
FIG. 7 is a flow chart showing a further modification of the operation illustrated in FIG. 2.
Figure 8:
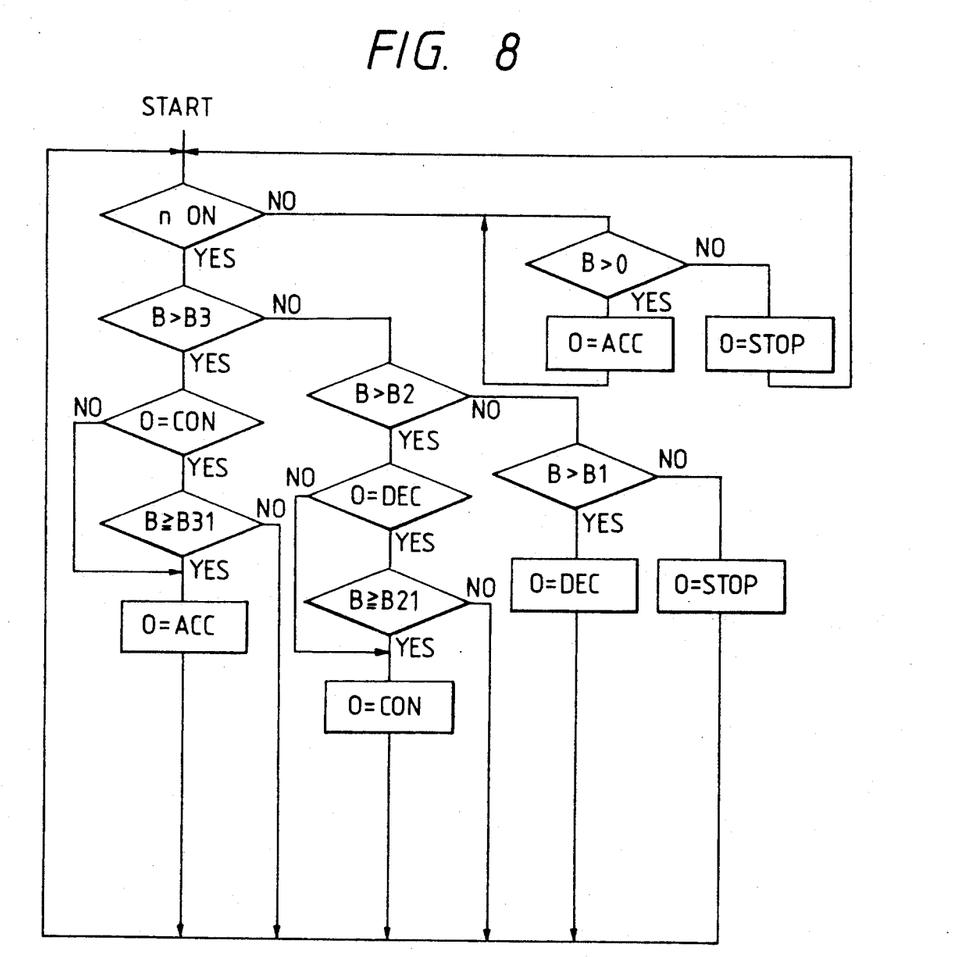
FIG. 8 is a flow chart showing a further modification of the operation illustrated in FIG. 5.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the first and second embodiments the detection of the count value A or B is made at a predetermined interval and the secondary scanning speed is determined, it is also appropriate to determine the secondary scanning speed when the region to which the count value A or B belongs is varied. Moreover, although in the transmission system the secondary scanning speed control is effected on the basis of the remaining capacity of the image memory and in the reception system it is performed on the basis of the non-recorded image information, it is also possible that in the transmission system it is effected on the basis of the used capacity of the image memory and in the reception system it is performed on the basis of the remaining capacity of the image memory. In addition, although in these embodiments the acceleration or deceleration is performed under the condition of limiting the secondary scanning speed to the maximum value Vmax or the predetermined value Vmid, it is also appropriate that the acceleration or deceleration is effected to be directed to a specific value between Vmax and Vmid. In this case, when reaching the specific value, the image reading section or the image recording section keeps the specific value as it is as long as the speed-instructing signal (c or o) changes. Further, after stopping, the re-start is made from the second region without waiting for returning to the third region. FIGS. 7 and 8 show the operations in the transmission system and the reception system, respectively.

What is claimed is:

1. A scanning control system for use in an image information transmission system equipped with image reading means for scanning an information-recorded member having thereon image information so as to read the image information, image memory means coupled to said image reading means for inputting the image information read by said image reading means and storing the read image information, and coding means coupled to said image memory means for coding the image information outputted from said image memory means and outputting coded image information to an external circuit, said scanning control system comprising:

remaining capacity detecting means coupled to said image memory means for detecting a remaining capacity in said image memory means in connection with the input of said image memory means from said image reading means and the output of said image memory means to said coding means; and scanning speed control means for controlling a scanning speed of said image reading means in accordance with the remaining capacity A of said image memory means detected by said remaining capacity detecting means so as to:
   1) when the remaining capacity A is equal to or greater than a predetermined value A3, continuously increase the scanning speed of said image reading means under a condition of limiting it to a predetermined speed Vmax;
   2) when the remaining capacity A is equal to a predetermined value A2 or is in a range between said predetermined value A3 and said predetermined value A2 where A2<A3, maintain the scanning speed of said image reading means as it is;
   3) when the remaining capacity A is equal to a predetermined value A1 or is in a range between said predetermined value A2 and said predetermined value A1 where A2>A1, continuously decrease the scanning speed under a condition of limiting it to a predetermined speed Vmid where Vmid<Vmax; and
   4) when the remaining capacity A is smaller than said predetermined value A1, stop the scanning of said image reading means.

2. A scanning control system as claimed in claim 1, wherein said scanning speed control means causes the scanning of said image reading means to change from a speed-maintaining state to a speed-increasing state at the time that said remaining capacity A becomes equal to or greater than a predetermined value B31, where B31>A3, when the remaining capacity A is changed from the state of A3>A≧A2 to the state of A≧A3.

3. A scanning control system as claimed in claim 1, wherein said scanning speed control means causes the scanning of said image reading means to change from a speed-decreasing state to a speed-maintaining state at the time that the remaining capacity A becomes equal to or greater than a predetermined value A21, where A2<A21<A3, when the remaining capacity A is changed from the state of A2>A≧A1 to the state of A3>A≧A2.

4. A scanning control system as claimed in claim 1, wherein said scanning speed control means re-starts the scanning at a predetermined speed Vmin where 0<Vmin≦Vmid when the remaining capacity A becomes equal to or greater than said predetermined value A1 after the stopping of the scanning.

5. A scanning control system for use in an image information reception system provided with decoding means for decoding image information inputted from an external circuit, image memory means coupled to said decoding means for storing the image information inputted from said decoding means, and image recording means coupled to said image memory means for scanning an information-recording member so as to record the image information inputted from said image memory means, said scanning control system comprising;

used capacity detecting means coupled to said image memory means for detecting a currently used capacity in said image memory means in connection with the input of said image memory means from said decoding means and the output of said image memory means to said image recording means; and scanning speed control means for controlling a scanning speed of said image recording means in accordance with the used capacity B of said image memory means detected by said used capacity detecting means so as to:
   1) when the used capacity B is equal to or smaller than a predetermined value B1, stop the scanning;
   2) when the used capacity B is equal to a predetermined value B2 or is in a range between said predetermined value B1 and said predetermined value B2 where B1<B2, continuously decrease the scanning speed under a condition of limiting it to a predetermined speed Vmid;
   3) when the used capacity B is equal to a predetermined value B3 or is in a range between said predetermined value B2 and said predetermined value B3 where B2<B3, maintain the scanning speed as it is; and
   4) when the used capacity B is greater than said predetermined value B3, continuously increase the scanning speed under a condition of limiting it to a predetermined speed Vmax where Vmax>Vmid.

6. A scanning control system as claimed in claim 5, wherein said scanning speed control means causes the scanning of said image recording means to change from a speed-maintaining state to a speed-increasing state at the time that said used capacity B becomes equal to or greater than a predetermined value B31, where B31>B3, when the used capacity B is changed from the state of B2<B≦B3 to the state of B3<B.

7. A scanning control system as claimed in claim 5, wherein said scanning speed control means causes the scanning of said image recording means to change from a speed-decreasing state to a speed-maintaining state at the time that the used capacity B becomes equal to or greater than a predetermined value B21, where B2<B21<B3, when the used capacity B is changed from the state of B1<B≦B2 to the state of B2<B≦B3.

8. A scanning control system as claimed in claim 5, wherein said scanning speed control means re-starts the scanning at a predetermined speed Vmin where 0<Vmin≦Vmid when the used capacity B becomes in the range between the predetermined value B2 and B3 after the stopping of the scanning.

* * * * *